United States Patent
Chaney

(10) Patent No.: US 7,201,384 B2
(45) Date of Patent: Apr. 10, 2007

(54) ELECTRIC VEHICLE CHASSIS WITH REMOVABLE BATTERY MODULE AND A METHOD FOR BATTERY MODULE REPLACEMENT

(76) Inventor: George T. Chaney, P.O. Box 710, Natalia, TX (US) 78059

( * ) Notice: Subject to any disclaimer, the term of this patent is extended or adjusted under 35 U.S.C. 154(b) by 436 days.

(21) Appl. No.: 10/645,025

(22) Filed: Aug. 21, 2003

(65) Prior Publication Data

US 2004/0035617 A1    Feb. 26, 2004

(51) Int. Cl.
*B60R 16/04* (2006.01)
(52) U.S. Cl. ............................ 280/68.5; 280/783
(58) Field of Classification Search ............... 180/68.5, 180/65.1, 311, 312; 280/781, 783; 320/104, 320/109, 112
See application file for complete search history.

(56) References Cited

U.S. PATENT DOCUMENTS

| | | | | |
|---|---|---|---|---|
| 3,477,538 A | * | 11/1969 | Hall et al. | 180/65.1 |
| 3,690,397 A | * | 9/1972 | Parker et al. | 180/65.6 |
| 3,708,028 A | * | 1/1973 | Hafer | 180/65.1 |
| 3,760,770 A | * | 9/1973 | Weaver et al. | 119/57.6 |
| 3,838,745 A | * | 10/1974 | Kappei | 180/68.5 |
| 4,102,273 A | * | 7/1978 | Merkle et al. | 104/34 |
| 5,542,488 A | * | 8/1996 | Nixon | 180/65.1 |
| 5,549,443 A | * | 8/1996 | Hammerslag | 414/809 |
| 5,612,606 A | * | 3/1997 | Guimarin et al. | 320/109 |
| 5,711,648 A | * | 1/1998 | Hammerslag | 414/800 |
| 5,760,569 A | * | 6/1998 | Chase, Jr. | 320/104 |
| 5,951,229 A | * | 9/1999 | Hammerslag | 414/398 |
| 5,998,963 A | * | 12/1999 | Aarseth | 320/109 |
| 6,631,775 B1 | * | 10/2003 | Chaney | 180/68.5 |

* cited by examiner

*Primary Examiner*—Christopher P. Ellis
*Assistant Examiner*—Bridget Avery
(74) *Attorney, Agent, or Firm*—Christopher L. Makay

(57) ABSTRACT

An electric powered vehicle includes a chassis defining a battery module compartment and a battery module insertable into the battery module compartment of the chassis. A method of replacing a battery module of an electric powered vehicle provides a service facility including a plurality of battery modules and a system for charging the battery modules. Upon the entry into the service facility of a driver in an electric powered vehicle with a depleted battery module, the depleted battery module is removed from the electric powered vehicle and replaced with a battery module including a fully charged battery. The driver is then charged for the battery module including the fully charged battery.

4 Claims, 4 Drawing Sheets

ELECTRIC VEHICLE CHASSIS WITH REMOVABLE BATTERY MODULE AND A METHOD FOR BATTERY MODULE REPLACEMENT

BACKGROUND OF THE INVENTION

1. Field of the Invention

The present invention relates to electric powered vehicles, and more particularly, but not by way of limitation, to an electric vehicle chassis having a removable battery module and a business method of replacing the battery module.

2. Description of the Related Art

Electrical powered vehicles have been available for many years but have never been widely accepted for use due to their limited range. An electrical powered vehicle typically includes an electric motor and drive train supported on a frame and enclosed in a body. A battery or bank of batteries are supported on the frame and connect to the electric motor to provide power thereto. The battery or bank of batteries requires a separate compartment and mounting assembly, which greatly increases vehicle weight and, thus, significantly limits vehicle range. Furthermore, the battery or bank of batteries was not normally removable from the vehicle, which rendered the vehicle inoperative during charging.

Electrical powered vehicles including removable battery packs to eliminate the necessity of placing the vehicle out of service during charging have been produced. Nevertheless, the removable battery packs still require a separate compartment and mounting assembly that increases vehicle weight to the point vehicle range is impracticably limited. Accordingly, there is a long felt need for an electrical powered vehicle design that integrates a removable battery pack in an existing vehicle structure, thereby reducing the excess weight that significantly limits vehicle range.

SUMMARY OF THE INVENTION

In accordance with the present invention, an electric powered vehicle includes a chassis defining a battery module compartment and a battery module insertable into the battery module compartment of the chassis. The electric powered vehicle further includes an access door coupled to the chassis, wherein the access door pivots from a closed position over the battery module compartment to an open position exposing the battery module compartment. The battery module includes a battery tray having an ignition contact to provide an electrical connection between the battery tray and an ignition system of the electric powered vehicle and a battery insertable into the battery tray. The battery includes an ignition contact to provide an electrical connection between the battery and the battery tray.

The electric powered vehicle further includes a locking assembly for locking the battery module within the battery module compartment of the chassis. The locking assembly includes a bolt residing within a cavity in the chassis, a biasing member for biasing the bolt to an unlocked position, and an electromagnetic field generator for generating an electromagnetic field that draws the bolt to a locked position within a cavity in the battery module. The locking assembly further includes a power contact engaged by the bolt in its locked position to provide an electrical connection among a battery of the battery module, the bolt, and an electric motor of the electric powered vehicle. The locking assembly still further includes an ignition contact engaged by the electromagnetic field generator to provide an electrical connection among a battery of the battery module, the electromagnetic field generator, and an ignition system of the electric powered vehicle.

The chassis includes a chassis front having a cross-member defining a front portion of the battery module compartment and a chassis rear having a cross-member defining a rear portion of the battery module compartment. The chassis front, the chassis rear, and a body of the electric vehicle may be formed integrally in a unibody construction, wherein a section of the body spanning the chassis front and the chassis rear defines a side portion of the battery module compartment. A chassis contact may be attached to the section of the body spanning the chassis front and the chassis rear to provide an electrical connection between a battery of the battery module and an ignition system of the electric powered vehicle. Alternatively, the chassis contact may be attached to the chassis front to provide an electrical connection between a battery of the battery module and an ignition system of the electric powered vehicle. The chassis may further include a support member attached between the chassis front and the chassis rear, wherein the support member defines a side portion of the battery module compartment. The chassis contact may be attached to the support member to provide an electrical connection between a battery of the battery module and an ignition system of the electric powered vehicle.

A method of replacing a battery module of an electric powered vehicle provides a service facility including a plurality of battery modules and a system for charging the battery modules. Upon the entry into the service facility of a driver in an electric powered vehicle with a depleted battery module, the depleted battery module is removed from the electric powered vehicle and replaced with a battery module including a fully charged battery. The driver is then charged for the battery module including the fully charged battery, and the depleted battery module is recharged.

It is therefore an object of the present invention to provide a chassis defining a battery module compartment that receives a battery module therein as an integral part, thereby reducing vehicle weight and increasing vehicle range.

It is another object of the present invention to provide a battery module that easily slides into and out from the battery module compartment.

It is a further object of the present invention to provide a locking mechanism that maintains the battery module within the battery module compartment.

Still other objects, features, and advantages of the present invention will become evident to those of ordinary skill in the art in light of the following.

DETAILED DESCRIPTION OF THE PREFERRED EMBODIMENTS

Figure 1:
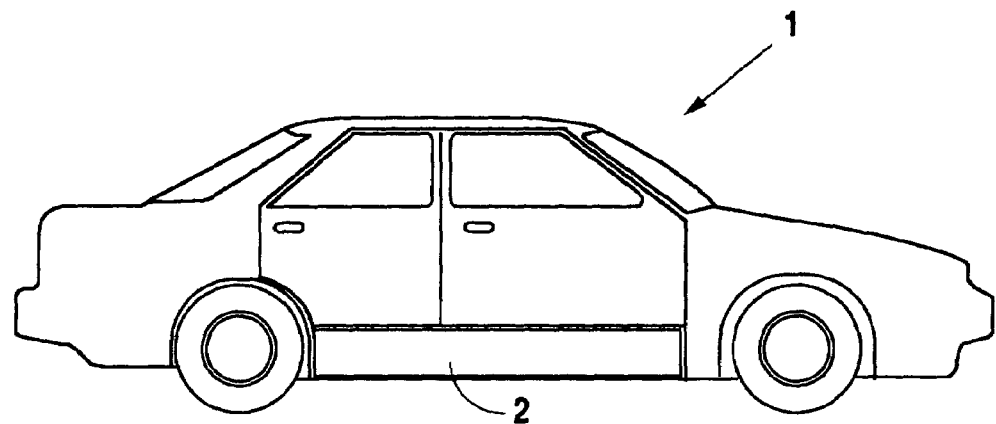
FIG. 1 is a side view illustrating an electric vehicle including an access door to a battery module compartment.
Figure 3:
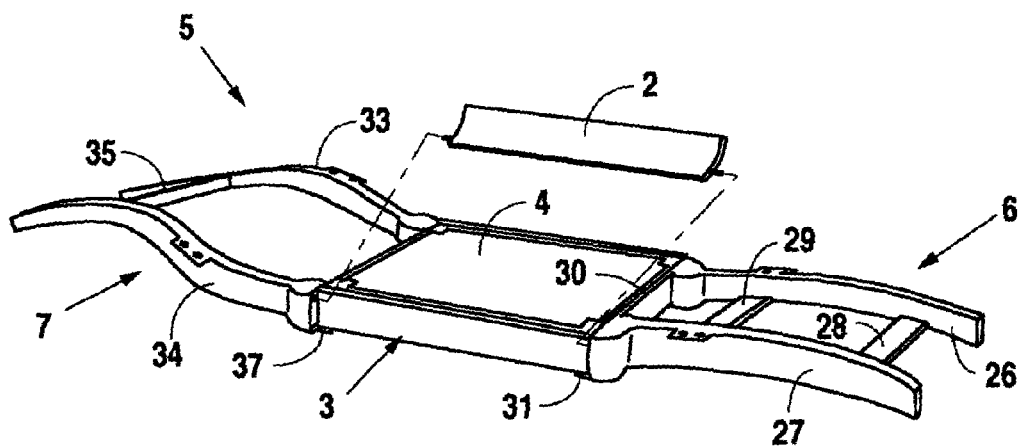
FIG. 3 is a perspective view illustrating a chassis of the electric vehicle including the battery module inserted therein.
Figure 4:
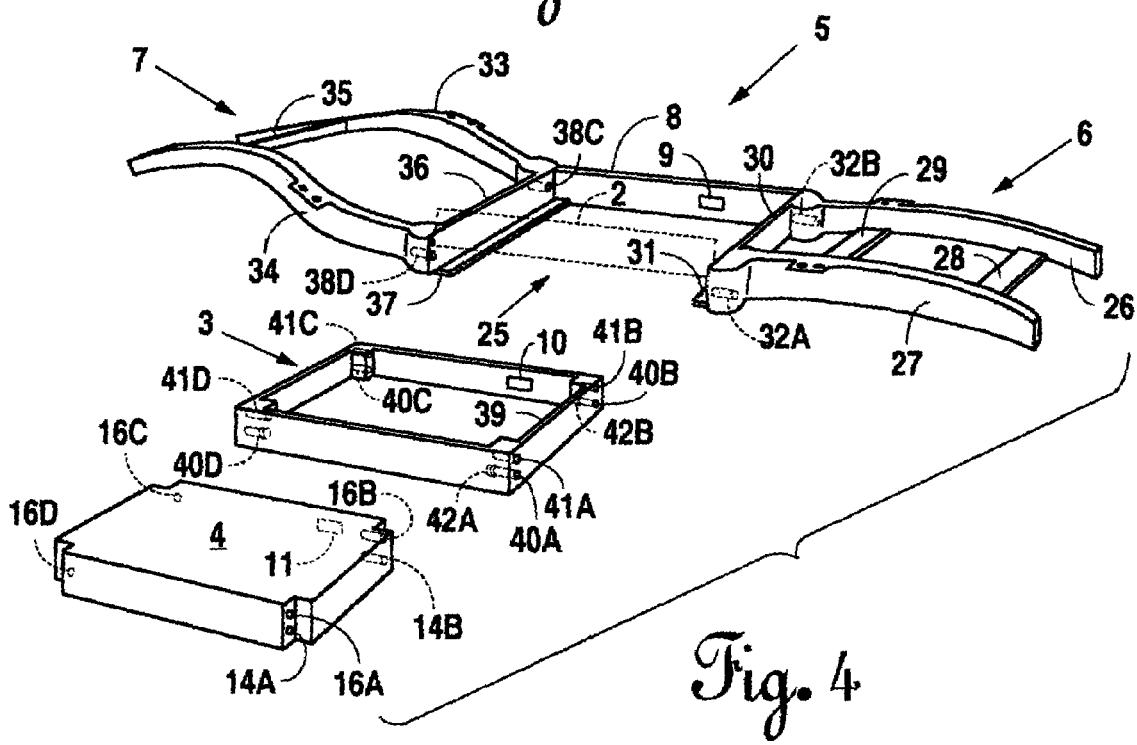
FIG. 4 is an exploded perspective view illustrating the chassis and the battery module.

As illustrated in FIGS. 1, 3, and 4, an electric vehicle 1 includes a chassis 5 defining a battery module compartment 25 for receiving a battery module 3 therein. The electric vehicle 1 further includes an access door 2 attached to the chassis 5 to provide access to the battery module compartment 25. In addition to the chassis 5, the battery module 3, and the access door 2, the electric vehicle 1 includes components well known to those of ordinary skill in the art, such as, an electric motor 18, a drive train including a transmission, wheels, a body, a suspension system, a braking system, a steering system, seats, interior amenities, and the like. These components mount to the chassis 5 and connect together in a manner well known to those of ordinary skill in the art to form the electric vehicle 1.

Figure 2:
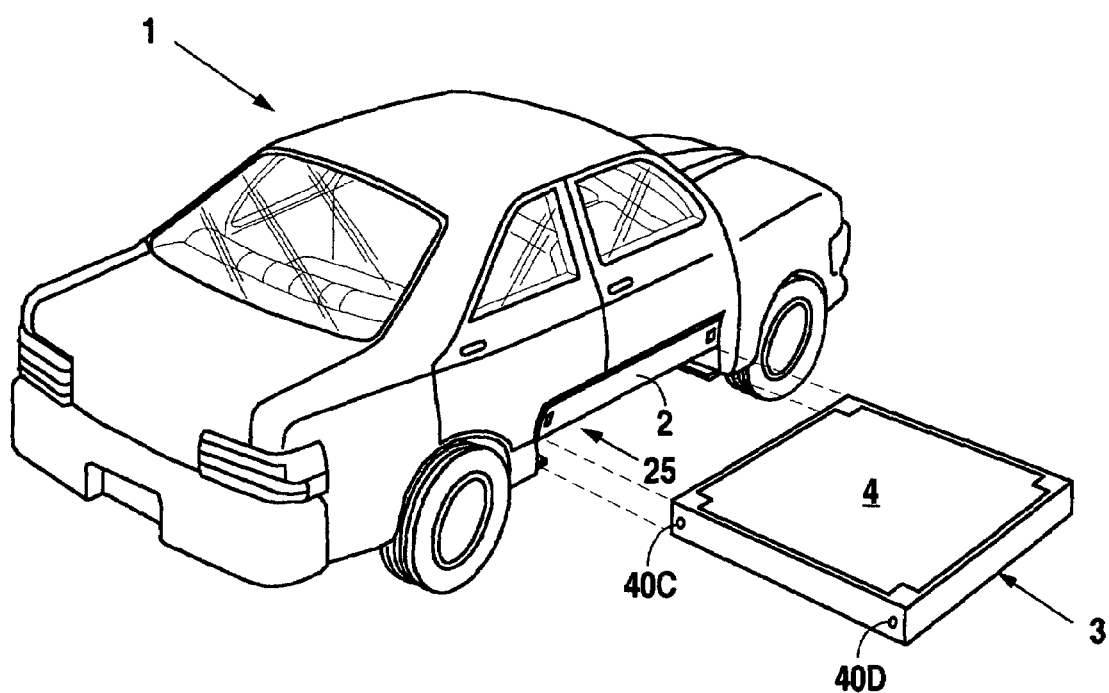
FIG. 2 is a perspective view illustrating the electric vehicle with a battery module removed.

As illustrated in FIGS. 2–4, the chassis 5 includes a chassis front 6, a chassis rear 7, and a support member 8. The chassis front 6 includes forks 26 and 27 spaced apart an appropriate distance and connected by crossbars 28 and 29 using any suitable means, such as welding. The crossbars 28 and 29 are spaced at appropriate intervals along the forks 26 and 27 to provide stability and support. A cross-member 30 attaches between the forks 26 and 27 at an interior end, using any suitable means, such as welding. The cross-member 30 defines a front portion of the battery module compartment 25 and includes a support ledge 31 for receiving and supporting the battery module 3 thereon. The forks 26 and 27 include a cylindrical cavity 32A and 32B, respectively, at an interior end, which forms part of a locking assembly 12 (described herein with reference to FIG. 5).

The chassis rear 7 includes forks 33 and 34 spaced apart an appropriate distance and connected by a crossbar 35 using any suitable means, such as welding, to provide stability and support. A cross-member 36 attaches between the forks 33 and 34 at an interior end, using any suitable means, such as welding. The cross-member 36 defines a rear portion of the battery module compartment 25 and includes a support ledge 37 for receiving and supporting the battery module 3 thereon. The forks 33 and 34 include a cylindrical cavity 38C and 38D, respectively, at an interior end, which forms part of the locking assembly 12 (described herein with reference to FIG. 5).

The support member 8 attaches at an interior side end of the chassis front 6 and the chassis rear 7 using any suitable means, such as welding, to couple the chassis front 6 and chassis rear 7 together, thereby providing stability and support. The support member 8 further defines a side portion of the battery module compartment 25 to facilitate proper positioning of the battery module 3 within the battery module compartment 25. A chassis contact 9 attaches at an interior face of the support member 8 to aid in the delivery of power to the locking assembly 12 (described herein with reference to FIG. 8).

The access door 2 pivotally connects at an interior side end of the chassis front 6 and the chassis rear 7 opposite to the support member 8 using any suitable means, such as pins inserted within a cavity. The access door 2 is movable from a closed position to an open position. In the closed position, the access door 2 seals the battery module compartment 25 to lock the battery module 3 within the chassis 5, thereby preventing dislodgment or unwanted removal of the battery module 3 from the chassis 5. In the open position, the access door 2 exposes the battery module compartment 25 to permit access to the battery module 3 for replacement. It should be understood that, in the closed position, the access door 2 would be maintained shut using any suitable latching mechanism. Furthermore, the access door 2 may include a suitable locking mechanism operable only by a vehicle owner or authorized service technician to prevent the theft of the battery module 3. Although the access door 2 opens upwards and attaches to the chassis 5, those of ordinary skill in the art will recognize that the access door 2 may open downwards as well as connect to the electric vehicle 1 at other suitable locations, such as the body.

The battery module 3 includes a battery 4 and a battery tray 39 defining an enclosure for receiving the battery 4 therein. The battery tray 39 includes cylindrical cavities 40A–D at each end, which form part of a locking assembly 12 (described herein with reference to FIG. 5). The battery tray 39 further includes ignition contacts 10 and 41A–D, which aid in the delivery of power to the locking assembly 12 (described herein with reference to FIG. 8). The battery tray 39 still further includes power contacts 42A and B at a front end, which aid in the delivery of power to the electric motor 18 (described herein with reference to FIG. 8).

The battery 4 in this preferred embodiment is a rechargeable battery, such as a nickel-zinc battery, well known to those of ordinary skill in the art. The battery 4 fits within the battery tray 39 and is held therein either through a friction fit or a suitable securing mechanism, such as a clamp, strap, or the like. The battery 4 includes ignition contacts 11 and 16A–D, which engage the ignition contacts 10 and 41A–D of the battery tray 39 to permit the delivery of power from the battery 4 to the locking assembly 12 (described herein with reference to FIG. 8). The battery 4 further includes power contacts 14A and B at a front end, which engage the power contacts 42A and B of the battery tray 39 to aid in the delivery of power from the battery 4 to the electric motor 18 (described herein with reference to FIG. 8). Although only one battery 4 is disclosed, those of ordinary skill in the art will recognize that any number of batteries connected in series to produce the same results may be utilized.

Figure 5:
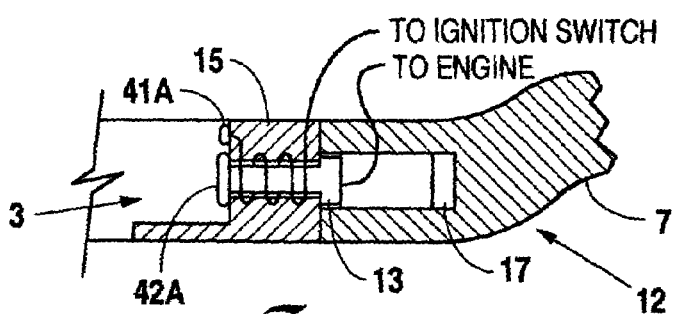
FIG. 5 is a cutout section view of the chassis illustrating a locking assembly.

As illustrated in FIG. 5, a locking assembly 12 includes a bolt 13 and a natural magnet 17, which reside in the cylindrical cavity 32A. The locking assembly 12 further includes a coil 15, an ignition contact 41A connected to the coil 15, and a power contact 42A engaged with the cylindrical cavity 40A. For the purposes of disclosure, only a locking assembly 12 associated with cylindrical cavities 32A and 40A will be described because the locking assembly 12 associated with the cylindrical cavities 32B and 40B is identical. Furthermore, the locking assemblies 12 associated with the cylindrical cavities 38C and 40C and with the cylindrical cavities 38D and 40D are identical, except those locking assemblies do not include a power contact as they merely lock the battery module to the rear chassis 7 and do not aid in the delivery of power from the battery 4 to the electric motor 18.

The natural magnet 17 attaches at the rear of the cylindrical cavity 32A using any suitable means, and the coil 15 resides within the battery tray 39 in a position encircling the cylindrical cavity 40A. The bolt 13 slides freely within the cylindrical cavity 32A from an unlocked to a locked position. When no power is applied to the locking assembly 12, the natural magnet 17 draws the bolt 13 away from the cylindrical cavity 40A and completely into the cylindrical cavity 32A, which is the unlocked position. In the unlocked position, the battery module 3 may be removed from the chassis 5, as the bolt 13 does not engage the battery tray 39. Although a natural magnet 17 is disclosed, those of ordinary skill in the art will recognize other suitable means for maintaining the bolt 13 in the unlocked position, such as a spring.

When power is applied to the locking assembly 12, the coil 15 energizes, creating an electromagnetic field that overcomes the magnetic field of the natural magnet 17, thereby drawing the bolt 13 into the cylindrical cavity 40A of the battery tray 39. The coil 15 draws the bolt 13 into the cylindrical cavity 40A until the bolt 13 engages the power contact 42A, which is the locked position. In the locked position, the battery module 3 cannot be removed from the chassis 5, as the bolt 13 engages the battery tray 39. Furthermore, the bolt serves as a contact in the transfer of power from the battery 4 to the electric motor 18 (described herein with reference to FIG. 8). Although the preferred embodiment discloses four locking assemblies, those of ordinary skill in the art will recognize that only one is necessary to maintain the battery module 3 within the chassis 5 and to aid in the delivery of power from the battery 4 to the electric motor 18.

As illustrated in FIGS. 2–5, a fully charged battery 4 is placed within a battery tray 39 to form a battery module 3. In placing the battery 4 into the battery tray 39, the ignition contacts 11 and 16A–D of the battery 4 engage the ignition contacts 10 and 41A–D of the battery tray 39, and the power contacts 14A and B of the battery 4 engage the power contacts 42A and B of the battery tray 39. The access door 2 is moved to its open position to expose the battery module compartment 25 and permit the removal of a depleted battery module 3. At this point, the locking assembly 12 is in its unlocked position due to the absence of power. The battery module 3 is positioned on the support ledges 31 and 37 of the cross-members 30 and 36 and slid into the battery module compartment 25 until the battery module 3 contacts and resides against the support member 8. With the battery module 3 positioned against the support member 8, the cylindrical cavities 32A and B and 38C and D align with a respective cylindrical cavity 40A–D. Furthermore, the ignition contact 10 resides completely through the battery tray 39 such that the ignition contact 10 engages the chassis contact 9 to form an electrical connection therebetween. After insertion of the battery module 3, the access door 2 is moved to its closed position to seal the battery module compartment 25, thereby preventing removal of the battery module 3. Upon the application of power as described herein with reference to FIG. 8, the locking assembly 12 moves to its locked position to secure the battery module 3 within the battery module compartment 25.

The chassis 5 defines a battery module compartment 25 that receives a battery module 3 therein, which becomes part of the chassis 5, to solve the excessive weight problem associated with electrical powered vehicles. The chassis 5 includes a removed portion (i.e., the battery module compartment 25) so that the chassis 5 incorporates the battery module 3, thereby eliminating the necessity of a separate battery assembly. The battery module 3 completes the chassis 5, which provides the chassis 5 with the required structural integrity, while reducing the weight of the electric powered vehicle 1 to a point where its range significantly improves over electrical powered vehicles having separate battery assemblies.

Figure 6:
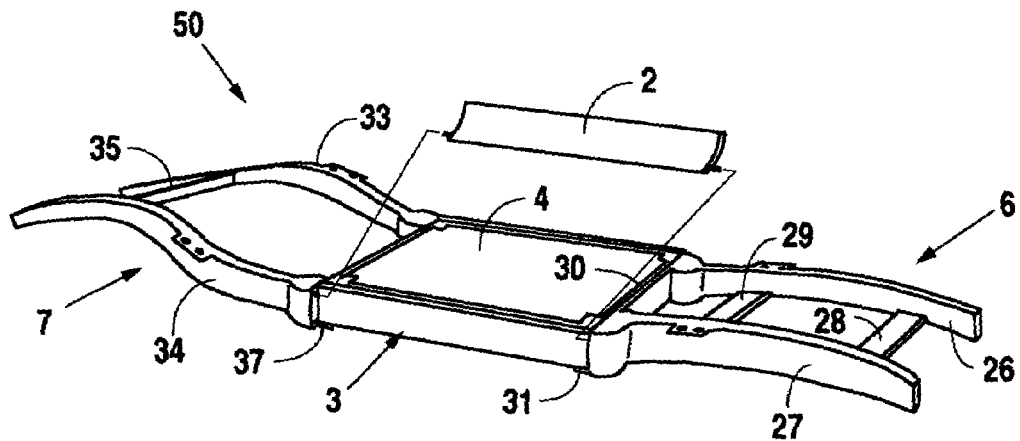
FIG. 6 is a perspective view illustrating an alternative chassis of the electric vehicle including the battery module inserted therein.
Figure 7:
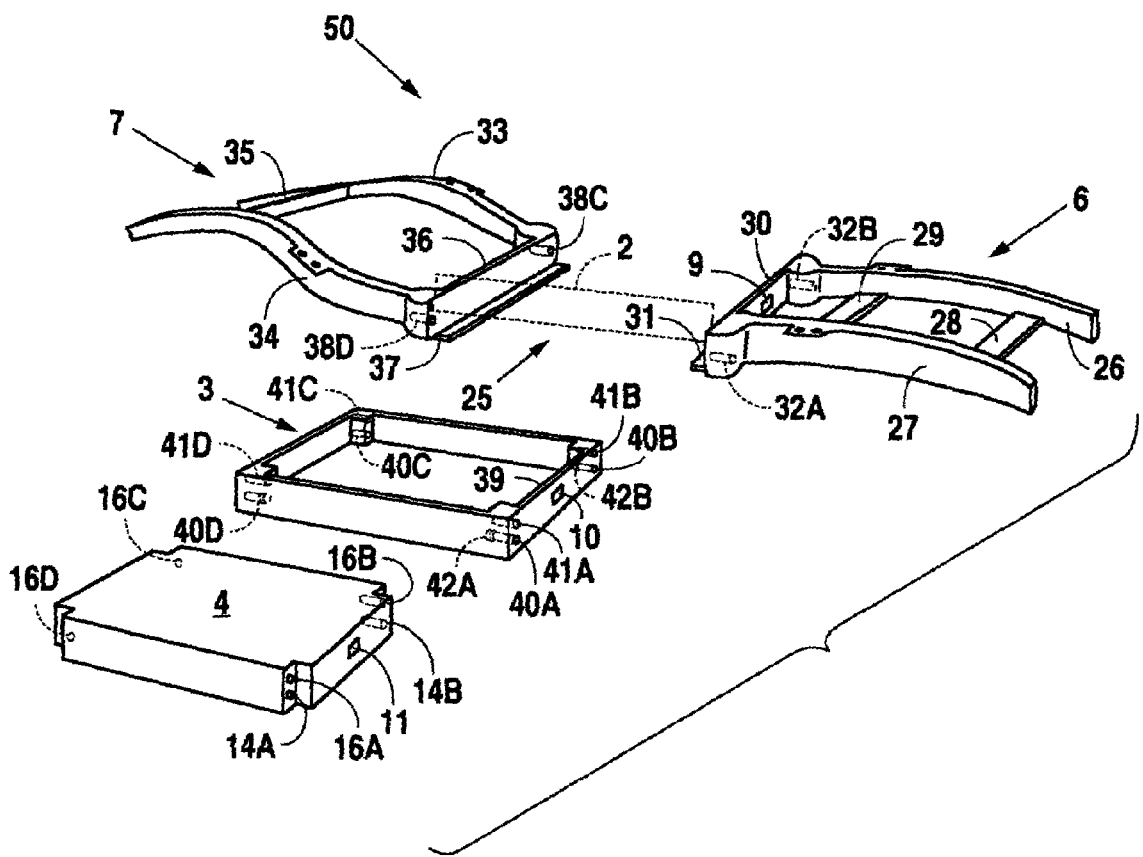
FIG. 7 is an exploded perspective view illustrating the alternative chassis and the battery module.

As illustrated in FIGS. 6 and 7, an alternative chassis 50 permits a unibody construction for the electric vehicle 1. In a unibody construction for the electric vehicle 1, the chassis 50 and the body of the electric vehicle 1 are formed integrally as one piece, which eliminates the need for the support member 8. The chassis 50 is identical in design, construction, and operation to the chassis 5 and like parts have been identified with like numerals, except the support member 8 has been eliminated. With the removal of the support member 8, the section of the body spanning the chassis front 6 and the chassis rear 7 opposite to the access door 2 forms a side portion of the battery module compartment 25. The chassis contact 9 may be mounted to the body section in a position similar to the position on support member 8, or, alternatively, the chassis contact 9 may be relocated from the support member 8 onto the cross-member 30. If the chassis contact is relocated, the ignition contact 10 is relocated from the side to the front of the battery tray 39, and the ignition contact 11 is relocated from the side to the front of the battery 4. Similar to the chassis 5, the ignition contact 11 of the battery 4 electrically connects with the ignition contact 10 of the battery tray 39, and, upon the insertion of the battery module 3 into the battery module compartment 25 until the battery module 3 abuts the sidewall of the battery compartment 25, the ignition contact 10 of the battery tray 39 electrically connects with the chassis contact 9.

Figure 8:
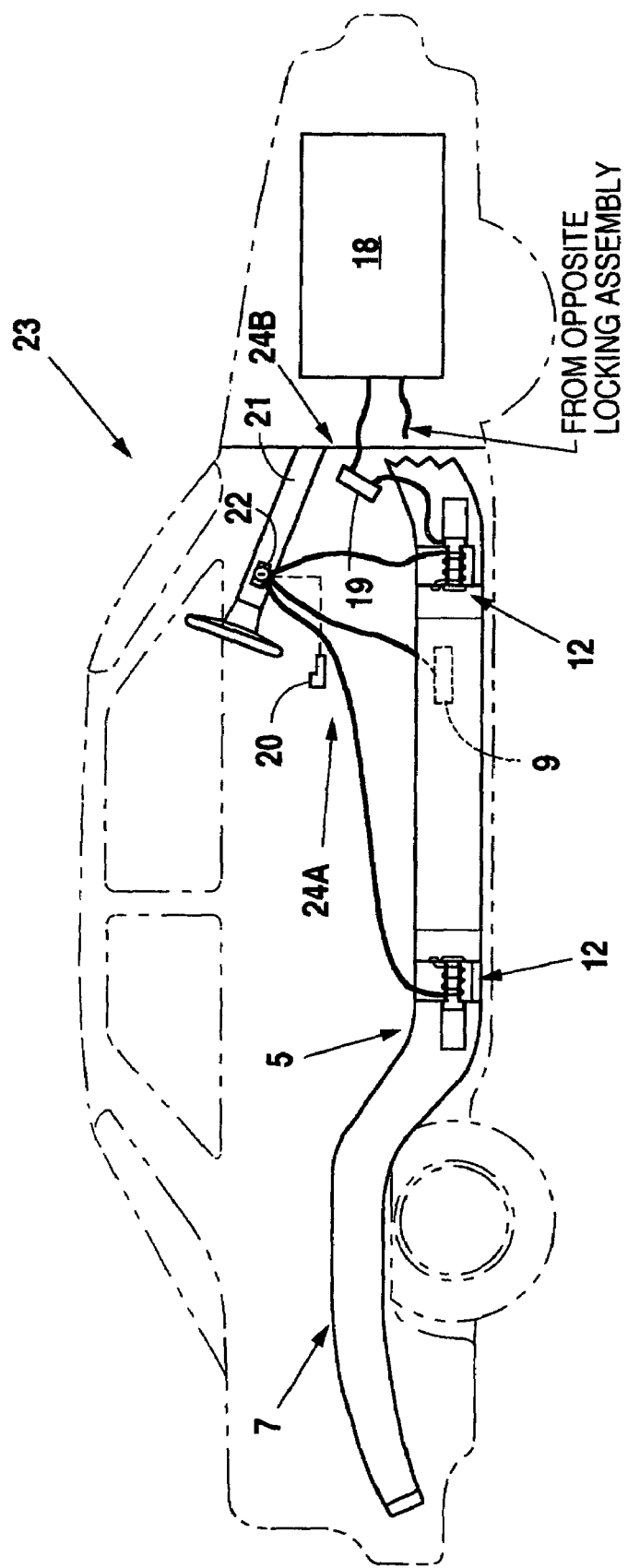
FIG. 8 is a section view illustrating a power supply system of the electric vehicle.

As illustrated in FIG. 8, a power supply system 23 includes an ignition system 24A and a driving system 24B. The ignition system 24A includes an ignition switch 22, which, in this preferred embodiment, is located on a steering column 21. The ignition switch 22 connects at an input side to the chassis contact 9 to receive power from the battery 4 using any suitable means, such as a wire run appropriately from the chassis 5 and along the steering column 21. The ignition switch 22 further connects at an output side to the coil 15 of a locking assembly 12 and to each coil of the remaining locking assemblies of the electric powered vehicle 1 using any suitable means, such as a wire run appropriately from the steering column 21 along the chassis 5. A key 20 moves the ignition switch 22 from an off position to an on position that permits the delivery of power from the battery 4 to the coil 15 of a locking assembly 12 and to each coil of the remaining locking assemblies of the electric powered vehicle 1.

The driving system 24B includes a variable power transfer device 19, which, in this preferred embodiment, is an accelerator pedal that operates a variable resistor, a silicon controlled resistor (SCR), and the like. The bolt 13 of a locking assembly 12 connects to the electric motor 18 to deliver power thereto from the battery 4 using any suitable means, such as a wire run appropriately from the bolt 13 along the chassis 5 and to a power input of the electric motor 18. The variable power transfer device 19 connects at an input side to the electric motor 18 using any suitable means, such as a wire run appropriately from the electric motor 18 along the chassis 5 and to the variable power transfer device 19. The variable power transfer device 19 connects at an output side to a bolt of an opposing locking assembly of the chassis front 6 to provide a return line to the battery 4. The variable power transfer device 19 connects to the bolt using any suitable means, such as a wire run appropriately from the variable power transfer device 19 along the chassis 5 and to the bolt. The variable power transfer device 19 allows a vehicle operator to regulate the delivery of power from the battery 4 to the electric motor 18 and, thus, vehicle speed.

In operation, a vehicle operator places the key 20 into the ignition switch 22 and moves the ignition switch to an on position that provides power from the battery 4 to the ignition system 24A. As a result, the coils energize, thereby drawing a respective bolt into a respective cylindrical cavity 40A–D to lock the battery module 3 within the chassis 5. Furthermore, the bolts associated with the driving system 24B engage a respective power contact 42A and B to permit the application of power from the battery 4 to the electric motor 18 under the control of the variable power transfer device 19. Thus, engaging the variable power transfer device 19 (i.e., stepping on the accelerator pedal) furnishes power in increasing levels to the electric motor 18, causing movement of the electric powered vehicle 1. When a vehicle operator uses the key 20 to move the ignition switch 22 to an off position, the coils de-energize, resulting in the natural magnets drawing a respective bolt into a respective cylindrical cavity 32A and B and 38C and D, thereby unlocking the battery module 3 and removing power from the electric motor 18. The electric vehicle 1 of this preferred embodiment de-energizes the coils and removes power from the electric motor 18 when the ignition switch 22 is in the off position to provide maximum conservation of the battery 4.

The electric vehicle 1 of this preferred embodiment, which includes a chassis 5 defining a battery module compartment 25 for receiving a battery module 3 that becomes integrated with the chassis 5, improves the effective range of the vehicle 1 by reducing vehicle weight. This increased effective range permits a service facility, whereby a customer entering a service facility with a depleted battery module 3 would have the depleted battery module 3 removed by a service technician and replaced with a battery module 3 including a fully charged battery 4. The service facility would include a plurality of battery modules 3, and a system for charging the battery modules 3. After removal, the depleted battery module 3 would be charged for use by another customer. Such a service would be similar to current gas stations, except, instead of paying for gas, the customer would pay a fee for the charged battery module, which, for example, could be based on the difference in charge between the depleted and charged battery modules 3 or simply be a flat rental type fee. The customer would drive the electric vehicle 1 until the depletion of the currently installed battery module 3, whereupon the customer would return to a service facility offering charged replacement battery modules 3. Those of ordinary skill in the art will recognize that the electric vehicle 1 would include a gauge, whereby the charge remaining on an installed battery module 3 would be communicated to a vehicle user.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope accordingly, is not to be limited in any respect by the foregoing description; rather, it is defined only by the claims that follow.

I claim:

1. A method of replacing a battery module of an electric powered vehicle, comprising:
   providing electric powered vehicles, each electric powered vehicle, comprising:
      a chassis defining a battery module compartment, and
      a battery module insertable into the battery module compartment of the chassis, whereby the battery module completes the chassis upon insertion into the battery module compartment thereby providing the chassis with required structural integrity necessary to support the electric powered vehicle during travel;
   providing a service facility for the electric powered vehicles;
   providing the service facility with a plurality of battery modules and a system for charging the battery modules;
   opening the service facility to drivers owning the electric powered vehicles, whereby a driver having an electric powered vehicle with a depleted battery module enters the service facility;
   removing the depleted battery module from the electric powered vehicle, thereby removing a portion of the chassis for the electric powered vehicle;
   inserting a fully charged battery module into the electric powered vehicle, thereby completing the chassis of the electric powered vehicle and providing the chassis with required structural integrity necessary to support the electric powered vehicle during travel; and
   charging the driver for the fully charged battery module.

2. The method according to claim 1, further comprising the step of recharging the depleted battery module.

3. The method according to claim 1, wherein the step of removing the depleted battery module from the electric powered vehicle comprises:
   opening an access door attached to the chassis to expose the battery module compartment; and
   sliding the depleted battery module from within the battery module compartment.

4. The method according to claim 3, wherein the step of inserting a fully charged battery module into the electric powered vehicle comprises:
   sliding the battery module including a fully charged battery into the battery module compartment; and
   closing the access door attached to the chassis to seal the battery module compartment.

* * * * *